United States Patent
Loescher et al.

(10) Patent No.: US 12,486,431 B2
(45) Date of Patent: Dec. 2, 2025

(54) INFRARED REFLECTIVE WRAP FILM

(71) Applicant: 3M INNOVATIVE PROPERTIES COMPANY, St. Paul, MN (US)

(72) Inventors: Claus W. Loescher, Neuss (DE); Domenica Kirchmeyer, Viersen (DE); Anja C. Rohmann, Moers (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 973 days.

(21) Appl. No.: 17/253,289

(22) PCT Filed: Jul. 1, 2019

(86) PCT No.: PCT/IB2019/055610
§ 371 (c)(1),
(2) Date: Dec. 17, 2020

(87) PCT Pub. No.: WO2020/008341
PCT Pub. Date: Jan. 9, 2020

(65) Prior Publication Data
US 2021/0122943 A1    Apr. 29, 2021

Related U.S. Application Data

(60) Provisional application No. 62/693,475, filed on Jul. 3, 2018.

(51) Int. Cl.
| | | |
|---|---|---|
| C09J 9/02 | (2006.01) | |
| C08K 3/013 | (2018.01) | |
| C09J 7/24 | (2018.01) | |
| C09J 7/25 | (2018.01) | |

(52) U.S. Cl.
CPC .......... *C09J 7/245* (2018.01); *C08K 3/013* (2018.01); *C09J 7/255* (2018.01); *C09J 9/02* (2013.01); *C08K 2201/001* (2013.01); *C08K 2201/013* (2013.01); *C09J 2427/006* (2013.01); *C09J 2467/006* (2013.01); *C09J 2475/006* (2013.01); *Y10T 428/1476* (2015.01); *Y10T 428/28* (2015.01); *Y10T 428/2848* (2015.01)

(58) Field of Classification Search
None
See application file for complete search history.

(56) References Cited

U.S. PATENT DOCUMENTS

| | | | | |
|---|---|---|---|---|
| 5,171,479 | A * | 12/1992 | Maki | C08L 101/00 |
| | | | | 252/502 |
| 6,468,444 | B1 | 10/2002 | Meyer | |
| 6,989,056 | B2 | 1/2006 | Babler | |
| 9,034,445 | B2 | 5/2015 | Edwards | |
| 2002/0187341 | A1* | 12/2002 | Ko | C09J 7/245 |
| | | | | 428/343 |
| 2003/0152766 | A1 | 8/2003 | Vargo | |
| 2004/0191540 | A1 | 9/2004 | Jakobi | |
| 2006/0008641 | A1 | 1/2006 | Kiehne | |
| 2006/0024521 | A1* | 2/2006 | Everaerts | B32B 7/06 |
| | | | | 156/99 |
| 2006/0216453 | A1 | 9/2006 | Hubbard | |
| 2009/0087674 | A1 | 4/2009 | Slawikowski | |
| 2009/0247406 | A1 | 10/2009 | De Corte | |
| 2011/0079347 | A1 | 4/2011 | Mead | |
| 2013/0153137 | A1* | 6/2013 | Loescher | B44C 1/18 |
| | | | | 156/247 |
| 2014/0261084 | A1 | 9/2014 | Jones | |
| 2014/0332151 | A1* | 11/2014 | Loescher | B32B 27/304 |
| | | | | 156/247 |
| 2016/0085002 | A1 | 3/2016 | Tanaka | |

FOREIGN PATENT DOCUMENTS

| | | | |
|---|---|---|---|
| CA | 2485050 | 5/2005 | |
| DE | 102011006185 | 10/2012 | |
| EP | 0060667 A1 * | 3/1982 | C09J 7/02 |
| EP | 1179628 | 2/2002 | |
| WO | WO 2000-027629 | 5/2000 | |
| WO | WO 2002-026893 | 4/2002 | |
| WO | WO 2004-012689 | 2/2004 | |
| WO | WO 2007-050433 | 5/2007 | |
| WO | WO 2009-041964 | 4/2009 | |
| WO | WO 2010-049300 | 5/2010 | |
| WO | WO 2011-048913 | 4/2011 | |
| WO | WO 2011-101657 | 8/2011 | |
| WO | WO 2012-156337 | 11/2012 | |
| WO | WO 2014-067613 | 5/2014 | |
| WO | WO 2014-195829 | 12/2014 | |

OTHER PUBLICATIONS

Akzonobel, "Cool chemistry series", 2014, 8pages.
Huntsman, "Infrared reflection for exterior polymers",2013, 16pages.
Reflectance transmission, 2016, 3pages.
International Search report for PCT International Application No. PCT/IB2019/055610 mailed on Sep. 10, 2019, 6 pages.

* cited by examiner

*Primary Examiner* — Anish P Desai
(74) *Attorney, Agent, or Firm* — Jeffrey M. Olofson

(57) ABSTRACT

Provided are conformable infrared reflective wrap films, film forming compositions, methods of making, and uses of such wrap films. In preferred embodiments the conformable film comprises a polymer selected from poly(vinyl chloride) (PVC), polyurethane, polyester, and polyethylene terephthalate (PET), in particular PVC is preferred. The conformable infrared reflective wrap film is adhered to the exterior surface of a vehicle.

4 Claims, 6 Drawing Sheets

INFRARED REFLECTIVE WRAP FILM

BACKGROUND

Vehicles, especially dark colored vehicles and those with panoramic windows and/or sun roofs, heat up considerably in the sun. Indeed, we are all familiar with the warnings to not leave children or pets unattended in a vehicle, especially during the summer heat, for this very reason.

Despite the well understood nature of this problem, vehicle manufacturers have a very limited ability to control the temperature inside vehicle spaces such as cabins and cargo spaces.

Consumers often prefer a variety of colors for their vehicle, and companies are increasingly interested in graphic films which allow them to advertise on vehicles (their own, or on the vehicles of others). In order to combat the heating of a vehicle, especially a dark colored vehicle, a predominately white color may be used to reflect sunlight. However, this may not be aesthetically pleasing to a consumer. Alternatively, one may increase the use of air conditioning in the cabin and/or cargo areas to deal with the increased heat of darker colored vehicles. But, this decreases the fuel efficiency of the vehicle, increasing both the cost and the carbon footprint of operation.

There continues to exist a need for solutions to these vexing issues.

SUMMARY

In one aspect, the present application relates to a conformable infrared reflective wrap film.

In another aspect, the present application relates to a film forming composition comprising a poly(vinyl chloride) polymer in an amount of 100 parts per hundred (by weight), a plasticizer in an amount of up to 50 parts per hundred, a solvent in an amount of from 10 to 60 parts per hundred, and an infrared reflective pigment in an amount of from 5 to 80 parts per hundred.

As used herein, unless otherwise specified, parts per hundred refer to parts per hundred weight of the polymer used to make a base film, for instance, poly(vinyl chloride).

In yet another aspect, the present application relates to a method of making a film. The method comprises casting a film forming composition onto a substrate to provide a casted layer. The film forming composition comprises a poly(vinyl chloride) polymer in an amount of 100 parts per hundred, a plasticizer in an amount of up to 50 parts per hundred, a solvent in an amount of from 10 to 60 parts per hundred, an infrared reflective pigment in an amount of from 5 to 80 parts per hundred, and an electrically conductive additive in an amount of from 0.1 to 5 parts per hundred. The method further comprises drying the casted layer to provide a cast film.

In yet a further aspect, the present application relates to a vehicle having an exterior surface, wherein the vehicle has a conformable infrared reflective wrap film adhered to the exterior surface.

DETAILED DESCRIPTION

In one aspect, the present application relates to a conformable infrared reflective wrap film.

Figure 1:
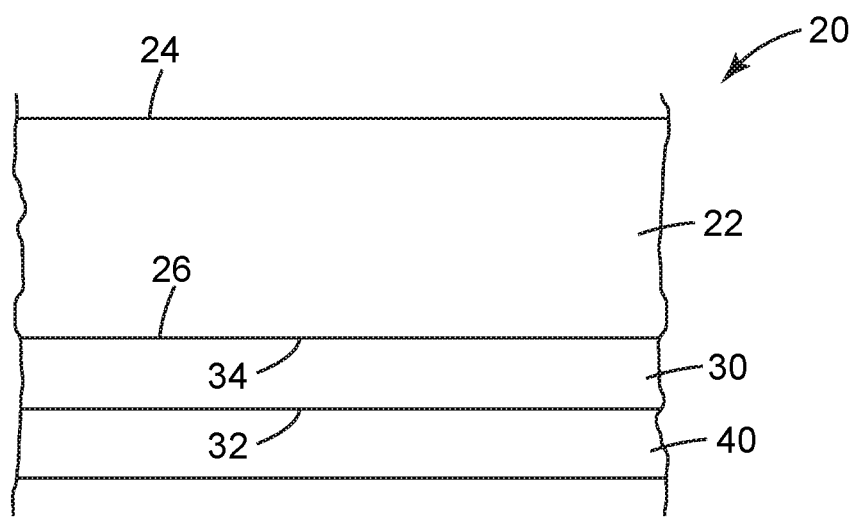
FIG. 1 is a cross-sectional side view of a conformable film.

Referring now to FIG. 1, an exemplary embodiment of infrared reflective wrap film 20 is illustrated, which generally includes base film 22 having first film surface 24 and second film surface 26, adhesive layer 30 having first adhesive surface 34 adjacent to second film surface 26 of base film 22, and release liner 40 adjacent to second adhesive surface 32 of adhesive layer 30.

The conformable film may comprise a base film. The base film may include a wide variety of materials, such as a single layer polyvinylchloride film that is approximately 50 µm thick with an elongation level of at least 50%, but can even be thinner than 15 µm or thicker than 150 µm.

Other exemplary materials that can be used as base film 22 include: a double layer polyvinylchloride film that is approximately 70-100 µm thick with an elongation level of at least 50%; a triple layer polyvinylchloride film that is approximately 130 µm thick with an elongation level of at least 50%; a composite film that includes one or two PVC layers and one or two polyester based layers, with a thickness between approximately 50 and 150 µm; a polyester-based film consisting of an iso-cyanate modified polyester crosslinked with a melamine resin that is approximately 20-100 µm thick with an elongation of greater than 50%; and an acrylic-based film consisting of modified acrylic resins having an elongation level of at least 50%; other polyester-based films; polypropylene films; polyurethane films; polyolefin films; and combinations of these and other films that are thinner or thicker than described above and/or that have larger or smaller elongations than described above.

The elongation may be determined according to DIN EN ISO 527.

While the base films are discussed herein as a single entity, it will be understood by those skilled in the art that such base films may be single layer films, or multilayer films. Further, multilayer films may comprise one or more films, each of which may be selected from one or more, identical or non-identical, suitable base films discussed herein.

The base film may be from 10 to 100 µm thick, from 30 to 70 µm thick or even from 40 to 60 µm thick. The choice of film thickness can depend on factors such as the shape of the surface being covered, the aesthetic of the film, the loading levels of infrared reflective pigment, the desired weatherability of the film, and the like.

As used herein, the term "conformable" generally refers to a film that can materially or completely take on the shape of a three-dimensional substrate containing convex features, concave features, and/or other shapes or contours. However, the determination of the conformability of a film is not limited to situations in which is it actually applied to such a substrate. Conformability also may mean that the film has this capability prior to being applied to a substrate. Taking on such shape is possible without undesired changes to the structural integrity and/or the aesthetic appearance of the film. In this sense, conformable films are distinguishable from non-conformable films that may be capable of being applied to planar surfaces and/or curved slightly around surfaces that have a sufficiently large radius of curvature (such as a large cylinder), but which are not possible to apply to a more complicated three-dimensional substrate.

Factors that can influence the conformability of a film include the identity of the material used to make the film (especially the base film), the molecular weight of such material, the conditions to which such film is subjected (e.g., temperature, radiation exposure, and humidity), and the presence of additives in the film material (especially in the base film) (e.g., plasticizer content, reinforcing fibers, pigments, stabilizers (e.g., UV stabilizers), and hardness enhancing particles).

The conformable film of described herein may comprise an infrared reflective pigment, particularly in the base film. Such pigments may permit the transmission of visible light and near infrared region radiation over the range of from 400 nm to 900 nm and reflect infrared region radiation such that the center reflective wavelength is between 1200 nm and 1300 nm.

Suitable infrared reflective pigments include both organic and inorganic pigments. For instance, pigments having a fixed cholesteric liquid crystal phase of helical pitch adjusted to achieve a desired reflective wavelength are suitable. Fine metal particles with a hexagonal or disc shape may also be used. Suitable commercially available pigments also include those typically used in the cosmetic industry, such as those described in WO 2004/012689; those used for construction and architectural materials such as the ones available from Akzo Nobel under their "Cool Chemistry Series"; and those used in coatings and inks, such as those available from Huntsman under its Altiris™ brand.

Even more specifically, infrared reflective pigments may include those comprising $TiO_2$, crystal form Rutile, alumina, and silica.

IR reflective pigments may, for instance, have a bulk density of from 1.0 to 2.0 $g/cm^3$, more specifically from 1.2 to 1.5 $g/cm^3$.

The amount of infrared reflective pigment should be chosen to give the desired film properties. For instance, the amount may be sufficient so that there is essentially no transmission of light of near infrared wavelength through the conformable film.

The conformable film may further comprise a plasticizer, which can be dispersed along with the infrared reflective pigment, in the base film.

Adhesive layer 30 and release liner 40 may include, for example, an acrylic adhesive and a siliconized liner, respectively. Adhesive layer 30 may include a number of materials or combinations of materials, including pressure sensitive adhesives, films having a network of microstructure air channels in the adhesive that allow air to escape laterally beneath the film (e.g., films available under the trade designation "Comply", commercially available from the 3M Company of St. Paul, Minnesota), and/or material commercially available from the 3M Company of St. Paul, Minnesota under the trade designation "Controltac" that allows an applicator to reposition the film during application. Release liner 40 can be positioned adjacent to adhesive layer 30. Release liner 40 is generally a protective film or paper layer that covers the adhesive layer until it is desired to expose the adhesive, such as for application of infrared reflective wrap film 20 to a surface.

It may be desirable to dispose an optional primer layer on second film surface 26 for improved adhesive bonding to base film 22.

In another aspect, the present application relates to a film forming composition comprising a poly(vinyl chloride) polymer in an amount of 100 parts per hundred, a plasticizer in an amount of up to 50 parts per hundred, a solvent (which may be a single solvent or a mixture of two or more solvents) in an amount of from 10 to 60 parts per hundred, and an infrared reflective pigment in an amount of from 5 to 80 parts per hundred. The film forming composition may further comprise from 0.1 to 5 parts per hundred of an electrically conductive additive; and/or from 1 to 10 parts per hundred of a heat stabilizing additive. The solvent(s) used in the film forming composition may, for instance, be a mixture of xylol and butylglycol.

The poly(vinyl chloride) polymer may have a specific gravity of from 1.1 to 1.7 g/cc as measured by ASTM D792. The poly(vinyl chloride) polymer may be a homopolymer.

In yet another aspect, the present application relates to a method of making a film. The method comprises casting a film forming composition onto a substrate to provide a casted layer. The film forming composition comprises a poly(vinyl chloride) polymer in an amount of 100 parts per hundred, a plasticizer in an amount of up to 50 parts per hundred, a solvent in an amount of from 10 to 60 parts per hundred, an infrared reflective pigment in an amount of from 5 to 80 parts per hundred, and an electrically conductive additive in an amount of from 0.1 to 5 parts per hundred. The method further comprises drying the casted layer to provide a cast film. Drying the casted layer may comprise, for instance, heating the casted layer in an oven.

The method of making a film as described herein may involve the use one or more solvents, and one or more plasticizers.

The method may further comprise preparing a first premixture and a second premixture, and mixing the first premixture and the second premixture to give the film forming composition. The first premixture may comprise an infrared reflective pigment, a first plasticizer, and a first solvent, and the second premixture may comprise a poly(vinyl chloride) polymer, a second plasticizer, a second solvent, and an electrically conductive additive (which may be present in an amount of from 0.1 to 5 parts per hundred).

Film forming compositions for making such films may comprise from 1 to 10 parts per hundred of a heat stabilizing additive.

In yet a further aspect, the present application relates to a vehicle having an exterior surface, wherein the vehicle has a conformable infrared reflective wrap film adhered to the exterior surface, particularly when the exterior surface is exterior to a refrigerated cargo space, and wherein the conformable infrared reflective wrap film is adhered to the exterior surface of the refrigerated cargo space.

The wrap films described herein find application with vehicle wrapping, but their utility is not so limited. They are available to wrap any surface and/or three-dimensional object (e.g., containers). When the term vehicle is used, it includes vehicles used in automotive, rail, aerospace, and maritime. Furthermore, and perhaps particularly, the wrap films described herein may be useful in electric vehicle applications, especially where energy savings are important, as use of climate control systems can severely limit battery life.

The wrap films described herein may be pigmented or not. When they are not pigmented, they may be transparent or even clear.

The present description may also be represented by the following embodiments:

Embodiment 1. A conformable infrared reflective wrap film.

Embodiment 2. The conformable film of embodiment 1, wherein the conformable film comprises infrared reflective pigment.

Embodiment 3. The conformable film of any of the previous embodiments, wherein the conformable film comprises
- a base film comprising a first film surface and an opposite second film surface;
- an adhesive layer comprising a first adhesive surface bonded to the second film surface and an opposite second adhesive surface;
- a release liner releasably attached to the second adhesive surface of the adhesive layer.

Embodiment 4. The conformable film of any of the previous embodiments, wherein the base film comprises a polymer selected from poly(vinyl chloride), polyurethane, polyester, and polyethylene terephthalate.

Embodiment 5. The conformable film of any of the previous embodiments, wherein the base film comprises a plasticizer.

Embodiment 6. The conformable film of embodiment 2, wherein the base film comprises an infrared reflective pigment and a plasticizer, further where each of the infrared reflective pigment and the plasticizer is dispersed in the base film (which base film may comprise a poly(vinyl chloride) polymer).

Embodiment 7. The conformable film of any of the previous embodiments, wherein the base film is from 10 to 100 μm thick.

Embodiment 8. The conformable film of embodiment 6, wherein the base film is from 20 to 90 μm thick.

Embodiment 9. The conformable film of embodiment 7, wherein the base film is from 30 to 70 μm thick.

Embodiment 10. The conformable film of any of embodiments 3 to 9, wherein the base film comprises a sufficient amount of infrared reflective pigment so that there is essentially no transmission of light of near infrared wavelength through the conformable film.

Embodiment 11. The conformable film of any of embodiments 3 to 10, wherein the infrared reflective pigment is an organic pigment.

Embodiment 12. The conformable film of any of embodiments embodiment 3 to 10, wherein the infrared pigment is an inorganic pigment.

Embodiment 13. A film forming composition comprising a poly(vinyl chloride) polymer in an amount of 100 parts per hundred, a plasticizer in an amount of up to 50 parts per hundred, a solvent in an amount of from 10 to 60 parts per hundred, and an infrared reflective pigment in an amount of from 5 to 80 parts per hundred.

Embodiment 14. The film forming composition of embodiment 13, further comprising from 0.1 to 5 parts per hundred of an electrically conductive additive.

Embodiment 15. The film forming composition of any of embodiments 13 to 14, further comprising from 1 to 10 parts per hundred of a heat stabilizing additive.

Embodiment 16. The film forming composition of any of embodiments 13 to 15, wherein the poly(vinyl chloride) polymer has a specific gravity of from 1.30 to 1.50 g/cc as measured by ASTM D792.

Embodiment 17. The film forming composition of any of embodiments 13 to 16, wherein the poly(vinyl chloride) polymer is a homopolymer.

Embodiment 18. The film forming composition of any of the embodiments 13 to 17, wherein the solvent is a mixture of two or more solvents.

Embodiment 19. The film forming composition of embodiment 18, wherein the solvent comprises xylol and butylglycol.

Embodiment 20. A method of making a film comprising
- casting a film forming composition onto a substrate to provide a casted layer, wherein the film forming composition comprises a poly(vinyl chloride) polymer in an amount of 100 parts per hundred, a plasticizer in an amount of up to 50 parts per hundred, a solvent in an amount of from 10 to 60 parts per hundred, and an infrared reflective pigment in an amount of from 5 to 80 parts per hundred, and an electrically conductive additive in an amount of from 0.1 to 5 parts per hundred, and
- drying the casted layer to provide a cast film.

Embodiment 21. The method of making a film of embodiment 20 wherein drying the casted layer comprises heating the casted layer in an oven.

Embodiment 22. The method of making a film of any of embodiments 20 to 21, wherein the solvent comprises a first and second solvent, and wherein the plasticizer comprises a first a second plasticizer.

Embodiment 23. The method of making a film of embodiment 22, further comprising
- preparing a first premixture and a second premixture, and
- mixing the first premixture and the second premixture to give the film forming composition,
- further wherein the first premixture comprises the infrared reflective pigment, the first plasticizer, and the first solvent, and
- wherein the second premixture comprises the poly(vinyl chloride) polymer, the second plasticizer, the second solvent, and the electrically conductive additive.

Embodiment 24. The method of making a film of embodiment 20, wherein the film forming composition further comprises from 0.1 to 5 parts per hundred of an electrically conductive additive.

Embodiment 25. The method of making a film of embodiment 20, wherein the film forming composition further comprises from 1 to 10 parts per hundred of a heat stabilizing additive.

Embodiment 26. A vehicle having an exterior surface, wherein the vehicle has a conformable infrared reflective wrap film adhered to the exterior surface.

Embodiment 27. The vehicle of embodiment 26, wherein the exterior surface is exterior to a refrigerated cargo space, and wherein the conformable infrared red reflective wrap film is adhered to the exterior surface of the refrigerated cargo space.

EXAMPLES

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

TABLE 1

Materials

| Identifier | Description |
|---|---|
| Xylol | Solvent, available from Brenntag GmbH, Essen, Germany |
| DIBK | Solvent, available from Brenntag GmbH, Essen, Germany |
| Terapin | Solvent, available from Brenntag GmbH, Essen, Germany |
| Admex 770 | Plasticizer, available from Eastman Chemical, Tennessee, USA |
| UBZ 630 TS | Heat stabilizer, available from Bearlocher, Unterschleissheim, Germany |
| Geon 178 | PVC resin, available from PolyOne, Avon Lake, Ohio, USA |
| BYK-ES 80 | Electrically conductive additive, available from Byk-Chemie GmbH, Wesel, Germany |
| Butylglycol | Solvent, available from Brenntag, Essen, Germany |
| Altiris 550 | IR reflective pigment, available from Huntsman, Stockton-on-Tees, UK |
| TiPure R 960 | White pigment, available from The Chermours Company, Wilmington, Delaware, USA |
| Sicopal K 0095 | Inorganic pigment based on chrome iron oxide, available from BASF, Ludwigshafen, Germany |
| Disperplast | Dispersing agent, available from Byk-Chemie GmbH, Wesel, Germany |
| Raven 1200 | Black pigment, available from Birla Carbon, Marietta, Georgia, USA |

Examples and comparative examples were prepared using the following compositions. Amounts are given in weight percentage based on the total weight of the composition as well as (phr) in parentheses.

TABLE 2

Examples and Comparative Examples

| Example | Ex 1 | Ex 2 | CE 3 | Ex 4 | Ex 5 | CE 6 |
|---|---|---|---|---|---|---|
| Xylol | 7.83 (18.08) | 7.09 (18.08) | | | | |
| DIBK | 5.79 (13.37) | 5.24 (13.37) | | | | |
| Terapin | 3.39 (7.84) | 3.07 (7.84) | | | | |
| Admex 770 | 15.16 (35.01) | 13.73 (35.01) | 15.74 (36.00) | 16.45 (34.04) | 15.90 (34.04) | 17.93 (34.04) |
| UBZ 630 TS | 2.17 (5.01) | 1.96 (5.01) | 2.19 (5.01) | 2.42 (5.00) | 2.34 (5.00) | 2.63 (5.00) |
| Geon 178 | 43.31 (100.00) | 39.20 (100.00) | 43.73 (100.00) | 48.32 (100.00) | 46.71 (100.00) | 52.69 (100.00) |
| BYK-ES 80 | 1.43 (3.30) | 1.29 (3.30) | | | | |
| Butylglycol | 2.17 (5.00) | 2.94 (7.50) | 20.85 (47.67) | 23.67 (48.98) | 22.88 (48.98) | 25.83 (49.02) |
| Altiris 550 | 18.75 (43.29) | 25.48 (65.00) | | | | |
| TiPure R 960 | | | 17.49 (39.99) | | | |
| Sicopal K 0095 | | | | 8.95 (18.51) | 11.80 (25.25) | |
| Disperplast | | | | 0.19 (0.39) | 0.37 (0.80) | 0.04 (0.08) |
| Raven 1200 | | | | | | 0.88 (1.68) |

Material Preparation

Examples 1, 2, 4, and 5 and Comparative Examples 3 and 6 were prepared according to the formulations given in Table 2.

Examples 1 and 2 were prepared by combining Altiris 550 with Admex 770 and butylglycol. Separately, Geon 178 was combined with Admex 770, UBZ 630 TS, BYK-ES 80 and Xylol, DIBK and Terapin. These separately prepared compositions were then combined to give the material for Examples 1 and 2.

Comparative Example 3 was prepared by combining Ti Pure R 960 with Admex 770 and butylglycol. Separately, Geon 178 was combined with Admex 770, UBZ 630 TS, and butylglycol. These separately prepared compositions were then combined to give the material for Comparative Example 3.

Examples 4 and 5 were prepared by combining Sicopal K 0095 with Admex 770 and Disperplast. Separately, Geon 178 was combined with Admex 770, UBZ 630 TS, and butylglycol. These separately prepared compositions were then combined to give the material for Examples 4 and 5.

Comparative Example 6 was prepared by combining Raven 1200 with Admex 770 and Disperplast. Separately, Geon 178 was combined with Admex 770, UBZ 630 TS, and butylglycol. These separately prepared compositions were then combined to give the material for Comparative Example 6.

Preparation of Films 1-6

Films 1-6 were prepared based on the corresponding materials of Examples 1, 2, 4, and 5 and Comparative Examples 3 and 6. Each formulation was coated on a casting liner with a K-Bar (K Hand Coater, Bar No. 5, Color Horn, Wet film deposit 50 μm, commercially available from RK PrintCoat Instruments Ltd., Litlington, Royston, Herts, United Kingdom) and dried in an oven at 90° C. for 1 minute and at 195° C. for another minute. The dry thickness of each of the coated films was approximately 50 μm.

Preparation of Films 7 and 8

Film 7 was prepared by mixing 50% by weight each of material from Example 5 and Comparative Example 6. Film 7 was then prepared as described above for Films 1-6, to a thickness of 50 μm.

Film 8 was prepared by first making a 25 μm thick film of material from Example 5 and onto that film casting a 25 μm thick film of material from Comparative Example 6, for a total film thickness of 50 μm.

Reflectance and Transmission Measurements

Reflectance and transmission was measured from 250 to 2500 nm with a Perkin Elmer Lambda 1050S device commercial available from Perkin Elmer, Waltham (Mass.), USA.

Figure 2:
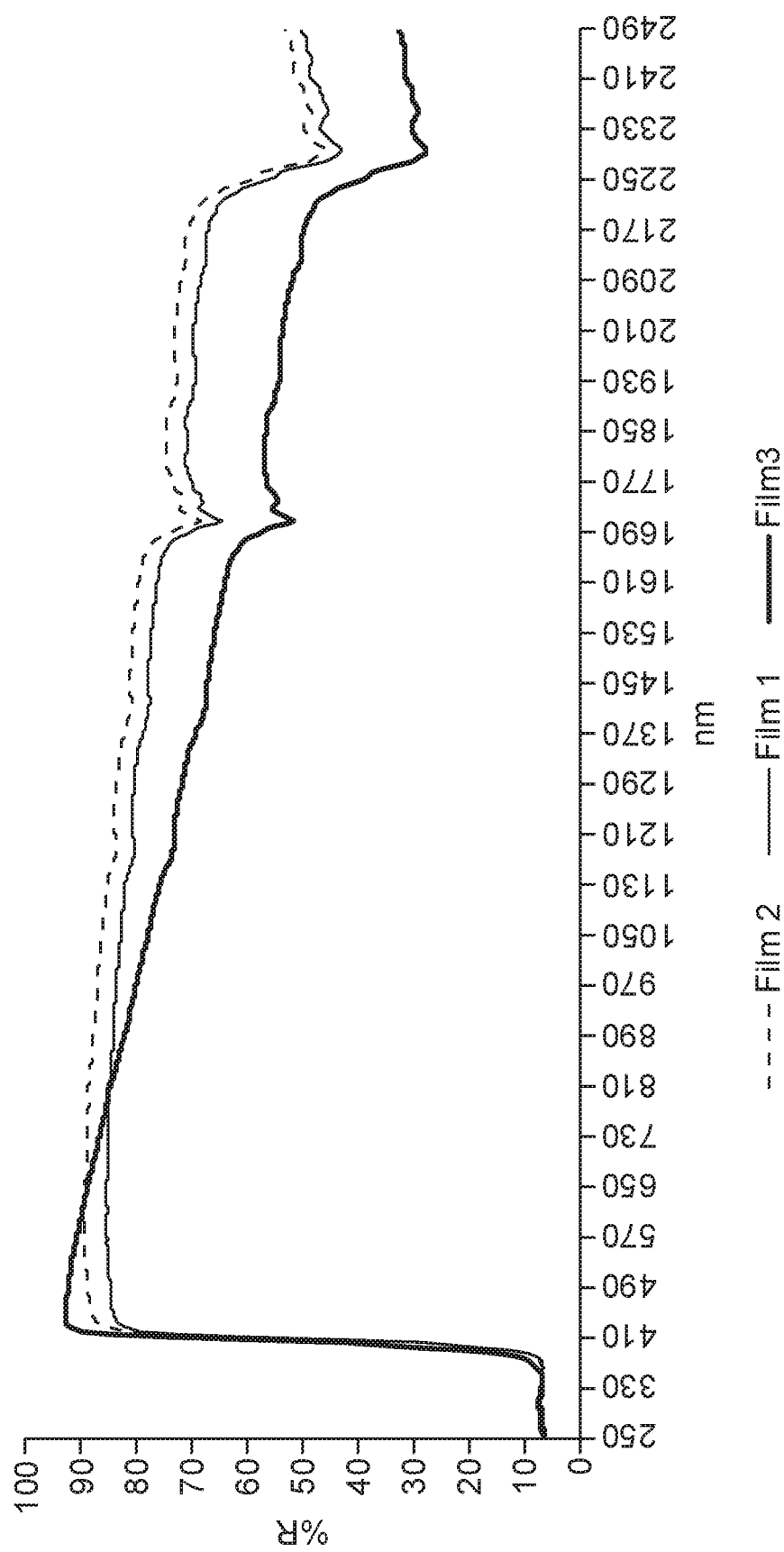
FIG. 2 is a plot of the reflectance of white PVC Films 1-3.

The reflectance of white PVC films 1-3 is shown in FIG. 2. From 800 nm onward, Film 1 (Example 1) had a higher reflectance of IR radiation than Film 3 (Comparative Example 3). From 630 nm onward, Film 2 (Example 2) had a higher reflectance of IR radiation than Film 3 (Comparative Example 3). The tinting strength of all three films was comparable.

Figure 3:
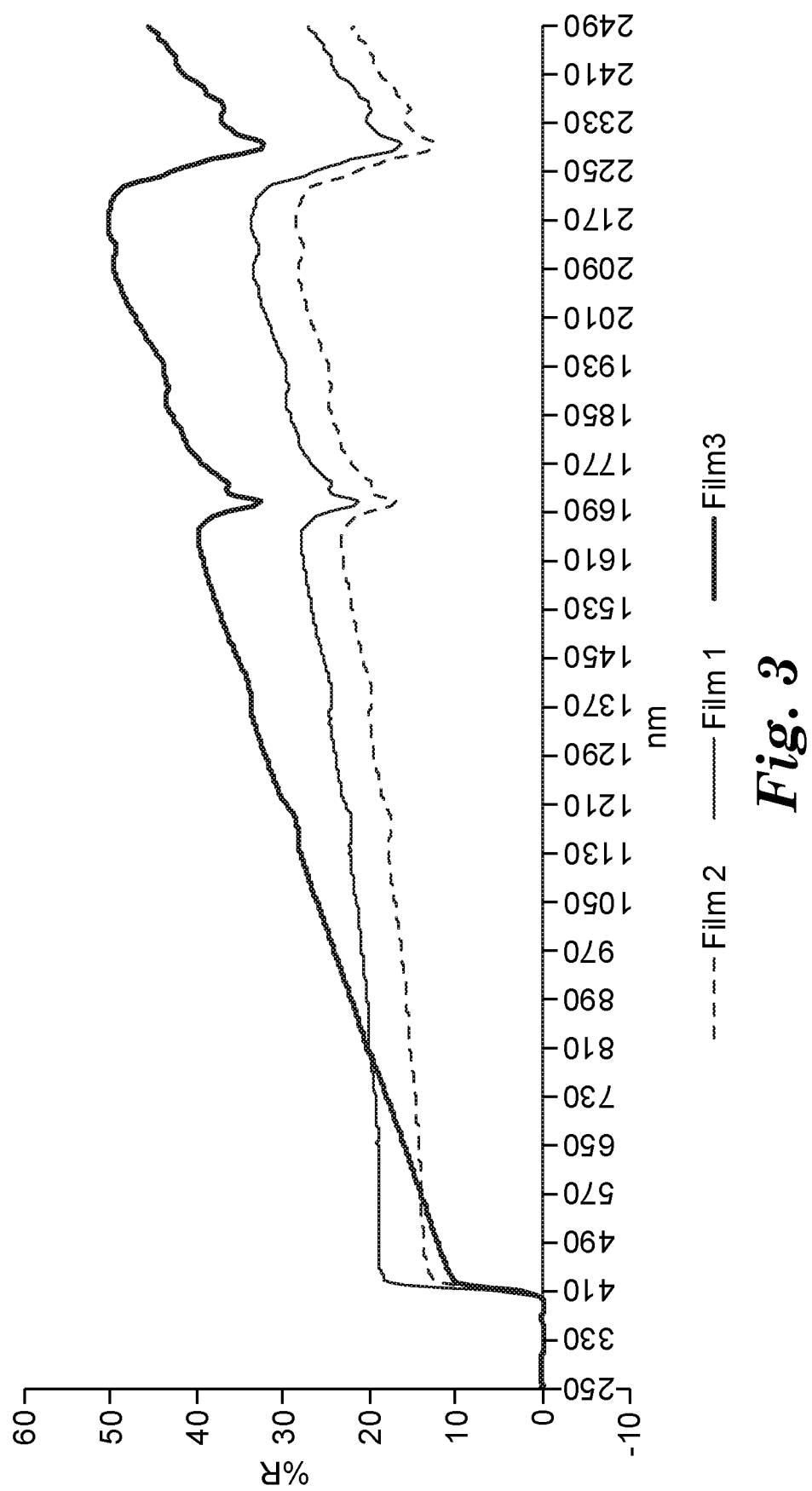
FIG. 3 is a plot of the transmission of white PVC Films 1-3.

The transmission of white PVC films 1-3 is shown in FIG. 3. From 800 nm onward, Film 1 (Example 1) had a lower transmission of IR radiation than Film 3 (Comparative Example 3). From 570 nm onward, Film 2 (Example 2) had a lower transmission of IR radiation than Film 3 (Comparative Example 3). The tinting strength of all three films was comparable.

Figure 4:
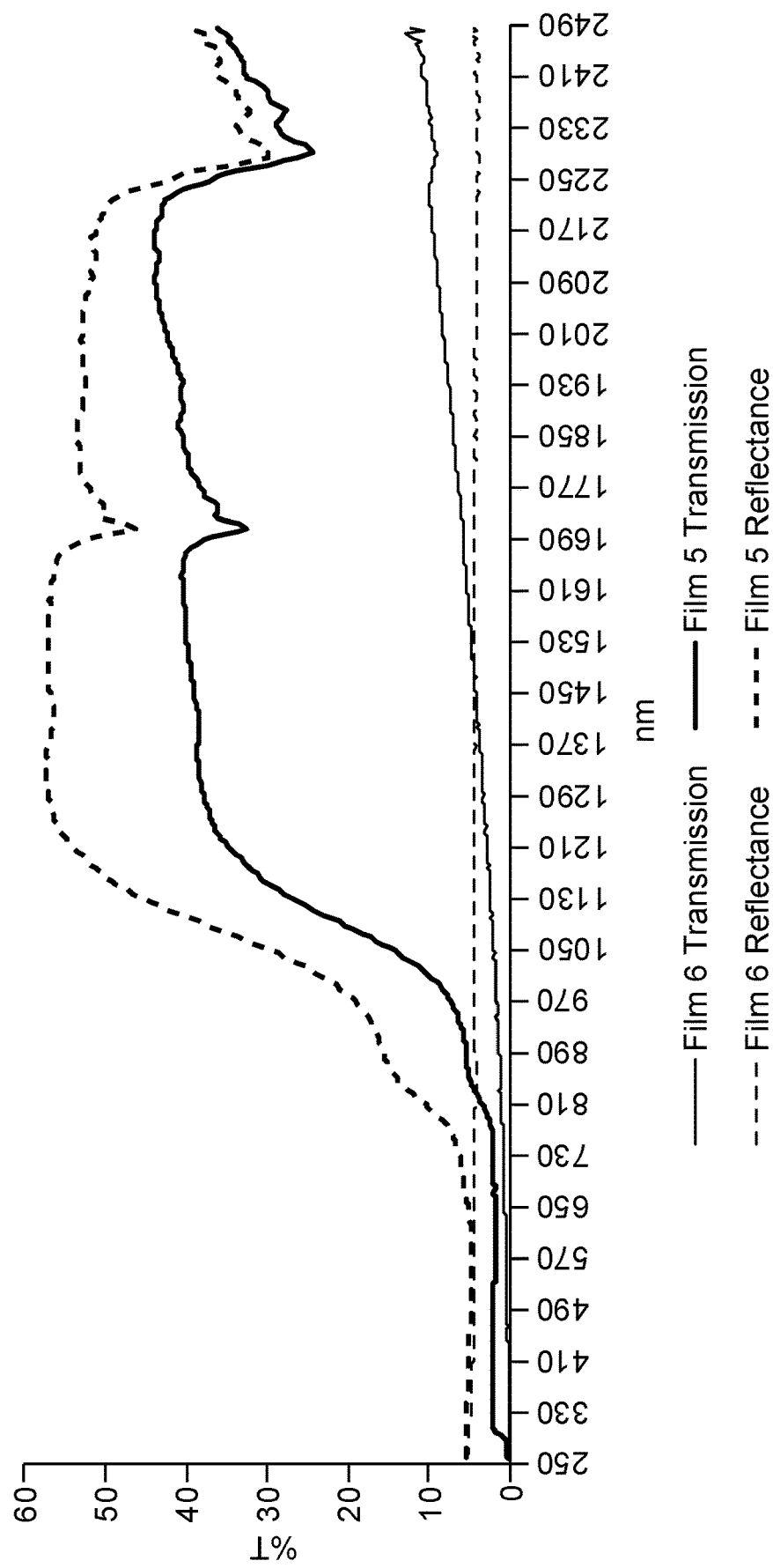
FIG. 4 is a plot of the transmission and reflectance of black PVC Films 5 and 6.

The transmission and reflectance of black PVC films 5 and 6 is shown in FIG. 4. From 700 nm onward, Film 5 (Example 5) had a higher reflectance of IR radiation than Film 6 (Comparative Example 6). Furthermore, from 300 nm onward, Film 5 (Example 5) had a higher transmission of IR radiation than Film 6 (Comparative Example 6). The tinting strength of both films was comparable.

Figure 5:
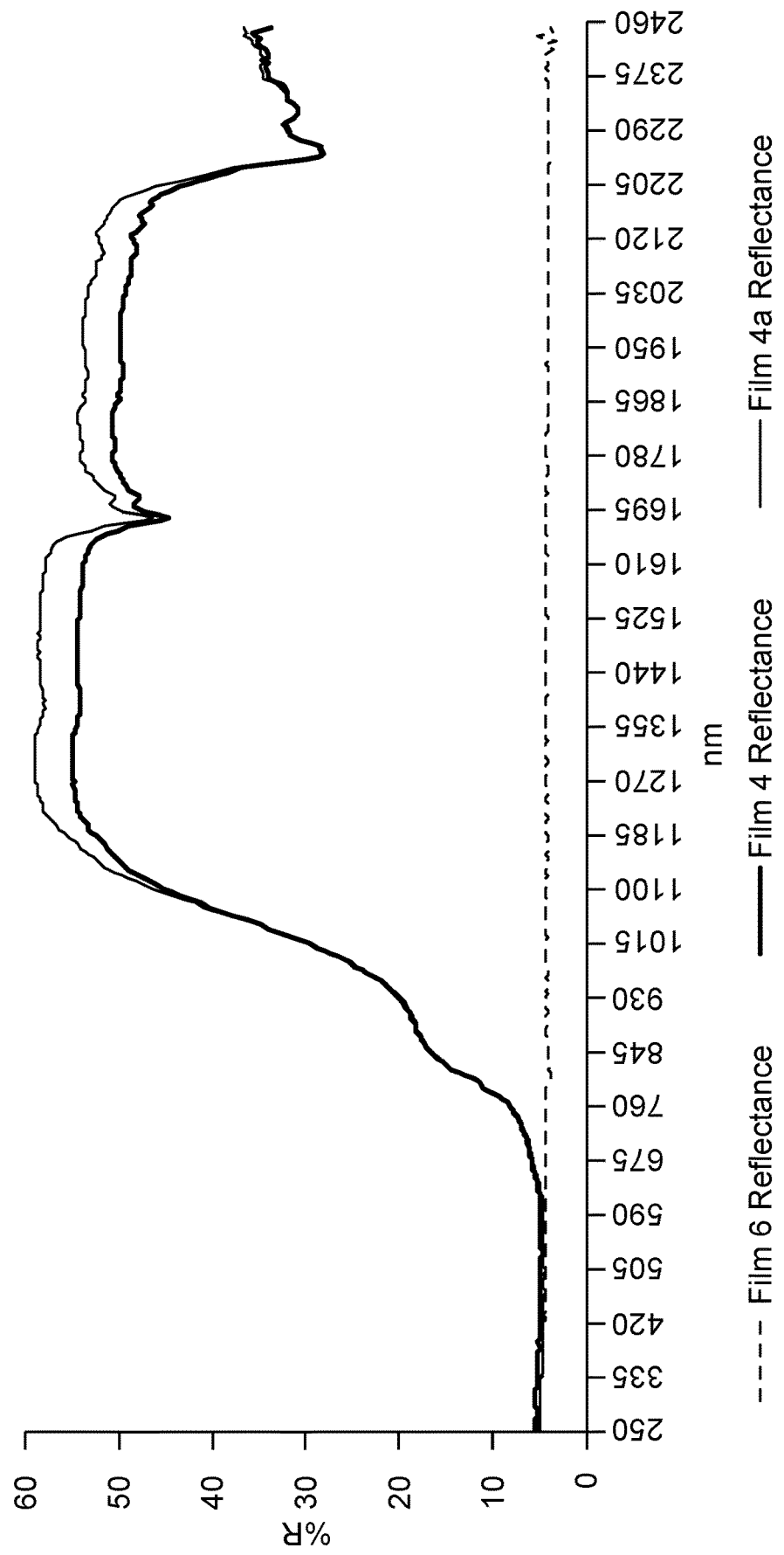
FIG. 5 is a plot of the reflectance of black PVC Films 4, 4a, and 6.

The reflectance of black PVC Films 4 (Example 4), 4a (Example 4) and 6 (Comparative Example 6) is shown in FIG. 5. Film 4a (Example 4) was prepared as described above for Films 1-6, except that the dry thickness of Film 4a (Example 4) was 63 μ. The increased film thickness of Film 4a (Example 4) compared to Film 4 (Example 4) showed a higher reflectance of IR radiation over the range of 1050 nm to 2250 nm. Both Film 4 (Example 4) and Film 4a (Example 4) showed higher reflectance than Film 6 (Comparative Example 6) from 700 nm onward.

Figure 6:
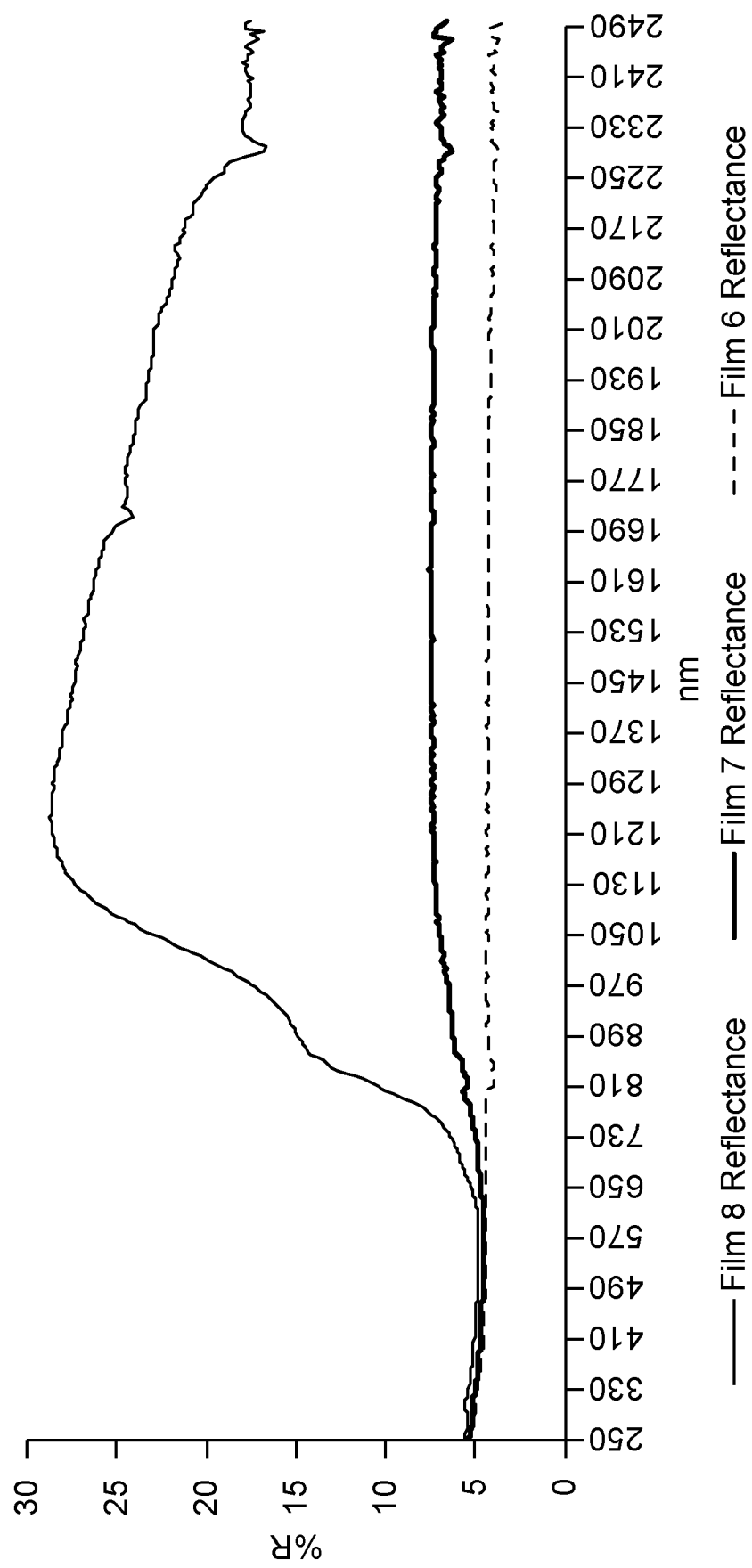
FIG. 6 is a plot of the reflectance of black PVC Films 6-8.

The reflectance of black PVC Films 6-8 is shown in FIG. 6. From 700 nm onward both Films 7 (mixture of Example 5 and Comparative Example 6) and 8 (layered construction with materials from Example 5 and Comparative 6) had higher IR reflectance than Film 6 (Comparative Example 6).

Measurement of Temperature When Warming

Warming of films and measurements of temperatures were done using a device consisting of two infrared heaters (Philips IR 150 W, commercial available from Philips Lighting, Eindhoven, Netherlands) fronted by two frames for sliding in two glass panes. Film 5 was applied on the float side of one glass pane, Film 6 was applied on the float side of the other glass pane, and the prepared glass panes were slid in the frame with the film side facing the IR heaters. Two stripes of masking tape were applied on the outer side of the glass panes as a target for the temperature measurements with two infrared thermometers. The heaters were switched on and temperature measurements were taken at intervals. The results are shown in Table 3.

TABLE 3

| Temperature Measurements | | |
|---|---|---|
| Film 5 (° C.) | Film 6 (° C.) | Time (s) |
| 22.4 | 21.8 | 12 |
| 25.2 | 33.2 | 24 |
| 25.6 | 36.6 | 36 |
| 26.4 | 40.4 | 48 |
| 28.6 | 48.6 | 60 |
| 31.2 | 50.8 | 90 |
| 32.4 | 58.2 | 120 |

The glass pane with Film 5 showed significantly lower increases of temperature compared to the glass pane with Film 6.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A conformable infrared reflective wrap film, wherein the conformable film comprises
    a base film;
    an adhesive layer comprising a first adhesive surface and an opposite second adhesive surface, wherein the first adhesive surface is bonded to a second surface of the base film;
    a release liner releasably attached to the second adhesive surface of the adhesive layer, wherein the base film consists of, by weight, a poly(vinyl chloride) resin in an amount of 100 parts by weight, a plasticizer in an amount of up to 50 parts by weight, an infrared reflective pigment in an amount of from 5 to 80 parts by weight, from 0.1 to 5 parts by weight of an electrically conductive additive, and from 1 to 10 parts by weight of a heat stabilizing additive.

2. The conformable infrared reflective wrap film of claim 1, wherein the base film is from 20 to 90 μm thick.

3. A vehicle having an exterior surface, wherein the vehicle has a conformable infrared reflective wrap film of claim 1 adhered to the exterior surface.

4. The vehicle of claim 3, wherein the exterior surface is exterior to a refrigerated cargo space, and wherein the conformable infrared reflective wrap film is adhered to the exterior surface of the refrigerated cargo space.

* * * * *